(12) United States Patent
Lambert et al.

(10) Patent No.: US 9,978,282 B2
(45) Date of Patent: May 22, 2018

(54) RIDE CHAINING

(71) Applicant: Lyft, Inc., San Francisco, CA (US)

(72) Inventors: Chris Lambert, San Francisco, CA (US); Logan Green, San Francisco, CA (US); Frank Taehyun Yoo, San Francisco, CA (US); Marc Haumann, San Francisco, CA (US); David Dryjanski, San Francisco, CA (US); Lev Popov, San Francisco, CA (US)

(73) Assignee: LYFT, INC., San Francisco, CA (US)

( * ) Notice: Subject to any disclaimer, the term of this patent is extended or adjusted under 35 U.S.C. 154(b) by 0 days. days.

(21) Appl. No.: 15/603,240

(22) Filed: May 23, 2017

(65) Prior Publication Data
US 2017/0256168 A1    Sep. 7, 2017

Related U.S. Application Data

(63) Continuation of application No. 14/723,134, filed on May 27, 2015, now Pat. No. 9,679,489.

(60) Provisional application No. 62/027,727, filed on Jul. 22, 2014.

(51) Int. Cl.
| | | |
|---|---|---|
| *G08G 1/00* | (2006.01) | |
| *G01C 21/36* | (2006.01) | |
| *G01C 21/34* | (2006.01) | |
| *G08G 1/123* | (2006.01) | |

(52) U.S. Cl.
CPC ......... *G08G 1/202* (2013.01); *G01C 21/3438* (2013.01); *G08G 1/123* (2013.01); *G01C 21/36* (2013.01)

(58) Field of Classification Search
CPC .... G01C 21/3438; G01C 21/36; G08G 1/123; G08G 1/202
USPC ........................................................ 701/117
See application file for complete search history.

(56) References Cited

U.S. PATENT DOCUMENTS

| | | | |
|---|---|---|---|
| 8,126,903 B2 * | 2/2012 | Lehmann | G06Q 10/06 707/736 |
| 8,504,295 B2 * | 8/2013 | Lerenc | G01C 21/3438 701/527 |
| 9,157,748 B2 | 10/2015 | Millspaugh | |
| 9,230,292 B2 | 1/2016 | Amin et al. | |

(Continued)

OTHER PUBLICATIONS

PCT International Search Report and Written Opinion dated Aug. 19, 2015 issued in application serial No. PCT/US2015/032687.

(Continued)

*Primary Examiner* — Tyler J Lee
(74) *Attorney, Agent, or Firm* — Keller Jolley Preece

(57) ABSTRACT

A system for determining a dispatch includes an input interface, a processor, and an output interface. The input interface is to receive a request for a first pickup including a first pickup location and a first destination. The processor is configured to determining a driver to dispatch to the first pickup location. The output interface is to provide a first pickup indication to the driver to go to the first pickup location. The input interface is further to receive a first pickup arrival indication indicating the driver arrived at the first pickup location. The output interface is further to provide a first destination indication indicating to the driver to go to the first destination. The input interface is further to receive a request for a second pickup including a second pickup location and a second destination.

20 Claims, 13 Drawing Sheets

(56) References Cited

U.S. PATENT DOCUMENTS

| | | | |
|---|---|---|---|
| 9,679,489 B2 | 6/2017 | Lambert et al. | |
| 2001/0056363 A1 | 12/2001 | Gantz et al. | |
| 2004/0088104 A1* | 5/2004 | Izbicki | G08G 1/123 701/117 |
| 2004/0093280 A1 | 5/2004 | Yamaguchi | |
| 2006/0034201 A1 | 2/2006 | Umeda et al. | |
| 2009/0248587 A1* | 10/2009 | Van Buskirk | G06Q 10/06 705/80 |
| 2010/0169199 A1 | 7/2010 | Fuller et al. | |
| 2011/0099040 A1* | 4/2011 | Felt | G06F 17/3087 705/7.12 |
| 2011/0184770 A1 | 7/2011 | Schwarzmann et al. | |
| 2011/0225269 A1 | 9/2011 | Yap et al. | |
| 2011/0301985 A1* | 12/2011 | Camp | G06Q 10/02 705/5 |
| 2012/0232943 A1 | 9/2012 | Myr | |
| 2012/0262430 A1 | 10/2012 | Farrelly et al. | |
| 2013/0006517 A1 | 1/2013 | Ofek et al. | |
| 2013/0102333 A1 | 4/2013 | Dam | |
| 2013/0158861 A1* | 6/2013 | Lerenc | G01C 21/3438 701/410 |
| 2013/0158869 A1* | 6/2013 | Lerenc | G01C 21/3438 701/527 |
| 2013/0179205 A1* | 7/2013 | Slinin | G06Q 10/04 705/7.13 |
| 2013/0246301 A1* | 9/2013 | Radhakrishnan | G06Q 30/0282 705/347 |
| 2014/0051465 A1 | 2/2014 | Ruys et al. | |
| 2014/0129135 A1 | 5/2014 | Holden et al. | |
| 2014/0188775 A1 | 7/2014 | Lehmann et al. | |
| 2015/0012341 A1 | 1/2015 | Amin | |
| 2015/0161554 A1 | 6/2015 | Sweeney et al. | |
| 2015/0161564 A1 | 6/2015 | Sweeney et al. | |
| 2015/0262430 A1 | 9/2015 | Farrelly et al. | |
| 2015/0324945 A1* | 11/2015 | Lord | G06Q 50/30 705/7.13 |
| 2017/0243492 A1 | 8/2017 | Lambert et al. | |

OTHER PUBLICATIONS

Michael Colman, Uber Driver Training Video Jun. 23, 2014.
Non-Final Rejection issued in U.S. Appl. No. 14/723,134 dated Dec. 8, 2016, 14 pages.
Non-Final Rejection issued in U.S. Appl. No. 14/723,134 dated Mar. 4, 2016, 12 pages.
Final Rejection issued in U.S. Appl. No. 14/723,134 dated Jul. 11, 2016, 14 pages.
Notice of Allowance issued in U.S. Appl. No. 14/723,134 dated Apr. 17, 2017, 11 pages.
U.S. Appl. No. 15/588,281, Jun. 7, 2017, Office Action.
Office Action as received in Canadian application 2956063 dated Nov. 28, 2017.
U.S. Appl. No. 15/588,281, Feb. 1, 2018, Office Action.

* cited by examiner

RIDE CHAINING

CROSS REFERENCE TO OTHER APPLICATIONS

This application is a continuation of U.S. patent application Ser. No. 14/723,134, filed May 27, 2015, which claims priority to U.S. Provisional Patent Application No. 62/027,727, filed Jul. 22, 2014, which disclosures are incorporated by reference in their entirety herein.

BACKGROUND OF THE INVENTION

A ride sharing system connects drivers who wish to share their vehicles with riders looking for a ride. Matching an individual rider with an individual driver gets the rider to his destination quickly. However, driver capacity is not used efficiently.

BRIEF DESCRIPTION OF THE DRAWINGS

Various embodiments of the invention are disclosed in the following detailed description and the accompanying drawings.

DETAILED DESCRIPTION

Figure 1:
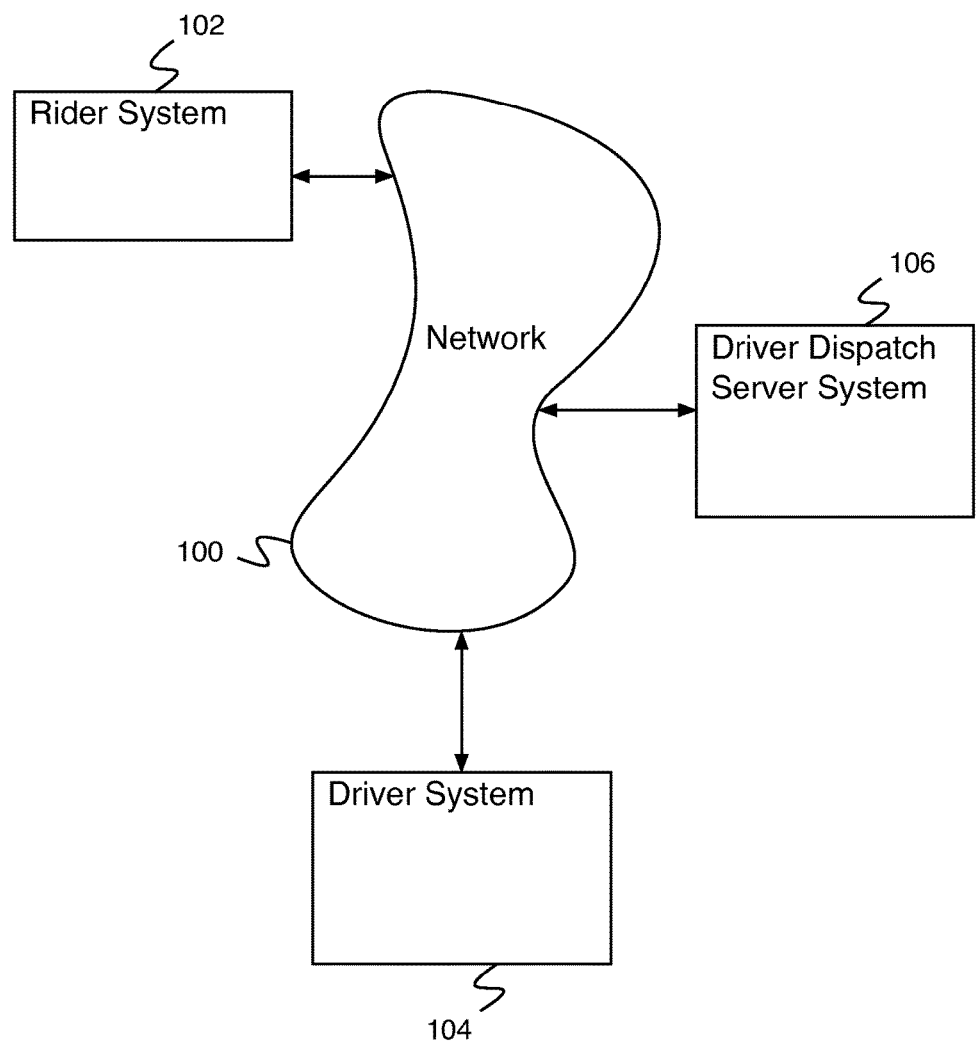
FIG. 1 is a block diagram illustrating an embodiment of a system for ride chaining.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Ride chaining is disclosed. A system for determining a dispatch comprises an input interface for receiving a request for a first pickup including a first pickup location and a first destination, a driver selection system for determining a driver to dispatch to the first pickup location, and an output interface for providing a first pickup indication to the driver to go to the first pickup location; wherein the input interface is further for receiving a first pickup arrival indication indicating the driver arrived at the first pickup location, wherein the output interface is further for providing a first destination indication indicating to the driver to go to the first destination; and wherein the input interface is further for receiving a request for a second pickup including a second pickup location and a second destination.

In some embodiments, a system for coordinating ride sharing between a set of drivers and a set of riders includes a driver system associated with each driver (e.g., a smartphone or other processing and communications device), a rider system associated with each rider (e.g., a smartphone or other processing and communications device), and a driver dispatch server system for dispatching drivers to give rides to riders. A rider uses the rider system to request a ride, the driver dispatch server system assigns the ride to a driver, the ride request is delivered to the driver using the driver system, and the driver drives to meet the rider and gives them the ride. In some embodiments, driver capacity can be used more efficiently by sharing rides. If two riders request similar rides (e.g., with similar start points and end points) or rides that overlap significantly at points closely in time, the ride can be shared. If both requests are received by the driver dispatch server system within a predetermined window of time, the driver dispatch server system determines that the rides should be shared, determines the correct order of stops (e.g., pick up passenger 1, pick up passenger 2, drop off passenger 2, drop off passenger 1), and provides the route to the driver. If a driver has already been assigned a route by the driver dispatch server system, and a request for a new ride is received by the driver dispatch server system that can be shared with the already assigned route, the driver dispatch server system modifies the route to include the new ride, and provides the new modified route to the driver. In some embodiments, the current destination of the driver can be modified to include the new route (e.g., where the driver is driving to when the new ride is added to the driver route). In some embodiments, any destination on the driver route after the current destination can be modified (e.g., a destination of the driver is not modified while the driver is on the way to the destination).

In some embodiments, when a rider starts the ride share app, he is initially given a choice of requesting an individual ride or a shared ride. In the event the rider selects an individual ride, a driver is immediately requested to pick up the rider. The rider typically communicates a destination to the driver directly rather than through the app. When the driver indicates that the ride is complete, a charge for the ride is determined (e.g., based on distance traveled and on time), and the rider is charged. In some embodiments, in the event the rider selects a shared ride, the rider is prompted for a destination address. The server uses the destination address to determine whether a ride can be combined. In some embodiments, the server determines a typical charge for the ride based at least in part on the pickup and destination addresses, applies a ride sharing discount to the charge, and provides the discounted charge amount to the rider, so the rider knows how much the ride will cost. In some embodiments, a ride sharing discount comprises a fixed amount (e.g., the price is reduced by 25%). In some embodiments, a ride sharing discount is determined based at least in part on the likelihood of finding a matching rider to share the ride with. In some embodiments, a rider requesting a shared ride is prompted for a party size (e.g., number of passengers) in order to ensure that there will be room in the car for another rider to share the ride.

In some embodiments, the server attempts to match the rider with another rider to share the ride. In the event there is already a rider with a similar ride waiting to share, the server matches the new rider with the waiting rider and dispatches a driver. In the event there is not already a rider with a similar ride waiting, the rider waits until another rider with a similar ride requests a shared ride. In some embodiments, the server determines whether two requested rides are similar enough to be combined by estimating a time for the desired rides for the first rider and second rider individually (e.g., taking separate individual rides) and for the combined ride for each rider (e.g., the time for the first rider pickup to the first rider dropoff and the second rider pickup to the second rider dropoff) and determining that it is appropriate to combine the rides in the event that combining the rides slows them down by less than a slowdown threshold (e.g., 5%, 10%, 5 minutes, etc.). In some embodiments, the slowdown threshold can vary (e.g., by location, time of day, passenger mood, etc.). In some embodiments, different passengers can have different slowdown thresholds for accepting a combined ride. In some embodiments, the system has a predetermined time-out threshold for the shared ride waiting time (e.g., the rider waits no more than 10 minutes to locate another rider). In some embodiments, the rider is provided with a waiting estimate based on typical ride request statistics. In some embodiments, in the event the waiting estimate is above a threshold (e.g., the time-out threshold or another threshold), the rider is informed that the chance of finding a shared ride is too unlikely and is returned to the individual ride request section of the app. If no rider is found to share the ride within the time-out threshold, the rider is given an individual ride. In some embodiments, the rider is charged the shared ride price regardless of whether a rider is found to share the ride with.

In some embodiments, in the event no rider is found to share the ride with, the rider is charged the full price. In some embodiments, when the driver arrives to pick up a rider as part of a shared ride, the rider has a time limit (e.g., 1 minute) to meet the driver (e.g., to prevent the other rider of the shared ride from waiting too long). In some embodiments, in the event the rider misses the time limit, he is still charged for his ride for inconveniencing the driver and the other rider. In some embodiments, in the event that the ride for the first rider and the ride for the second rider overlap by only a small amount, the ride sharing discount is reduced or eliminated (e.g., the riders are charged full price). In some embodiments, ride sharing includes three riders sharing a single ride. In some embodiments, ride sharing is limited to a vehicle's maximum seating capacity (e.g., passenger seats available, back seats available, etc.).

In some embodiments, trip efficiency is increased by dynamically selecting pickup and dropoff locations (e.g., dropping off the first passenger a block away from their destination in order to avoid the driver looping around the block or making a left turn onto a busy street; selecting a pickup point at a major intersection between both riders and instructing them to walk there, etc.).

In various embodiments, a system for ride chaining updates a pool of riders desiring rides in the event that an indication is received that a rider desires a ride, in the event that a rider indicates that a rider no longer desires a ride, a rider rejects a driver assigned to provide a ride, a rider accepts a driver assigned to a ride, a pickup location change, a dropoff location change, or any other appropriate indication. In some embodiments, a system for ride chaining updates a pool of potential drivers in the event that a new driver indicates availability to provide a ride, a driver indicates an available seat due to an upcoming drop-off, a driver indicates one less seat available due to a pickup, a driver indicates unavailability to provide a ride, a driver accepts a potential rider, a driver rejects a potential rider, a driver changes route (e.g., as indicated by position information received from a device location—for example, a GPS location signal indicating a vehicle location), a driver indicates a dropoff location change, a pickup location change, or any other appropriate event for updating a pool of potential drivers. In some embodiments, a system for ride chaining recalculates a selection of a driver for a rider based on an updated pool of riders and/or an updated pool of drivers.

FIG. 1 is a block diagram illustrating an embodiment of a system for ride chaining. In the example shown, FIG. 1 comprises network 100. In various embodiments, network 100 comprises one or more of the following: a local area network, a wide area network, a wired network, a wireless network, the Internet, an intranet, a storage area network, a cellular network, or any other appropriate communication network. Rider system 102 and driver system 104 comprise user systems (e.g., computing systems for operation by users). In some embodiments, one or more of rider system 102 and driver system 104 comprises a system accessed by a user directly (e.g., the user is in proximity with the user system). In some embodiments, one or more of user system 102 and user system 104 comprises a system accessed by a user remotely (e.g., the user is not in proximity with the user system, and accesses the user system via network 100 and a separate user system). In the example shown, rider system 102 and driver system 104 comprise mobile devices (e.g., smartphones, tablet computers, etc.). Rider system 102 and driver system 104 comprise systems accessing driver dispatch server system 106 (e.g., accessing driver dispatch server system 106 via network 100). In various embodiments, there are 2, 5, 22, 122, 4320, 26100, or any other appropriate number of user systems (e.g., rider systems and driver systems) accessing driver dispatch server system 106. Driver dispatch server system 106 comprises a system for managing drivers giving rides to riders. In some embodiments, driver dispatch server system 106 comprises a system for connecting a rider and a driver. In some embodiments, driver dispatch server system 106 comprises a system for determining a driver to assign a ride to. In some embodiments, driver dispatch server system 106 comprises a system for assigning multiple rides to a driver. In various embodiments, driver dispatch server system 106 comprises a computer, a computer with multiple processors, multiple computers connected via a local network, multiple computers connected via a wide area network, multiple computers connected via the Internet, multiple computers connected via network 100, or any other appropriate computing system or systems. In some embodiments, a processor of driver dispatch server system 106 is coupled with a memory for storing instructions to perform processes as described herein. In various embodiments, the processors comprising rider system 102, driver system 104, and driver dispatch server system 106 comprise any one of a variety of proprietary or commercially available single or multi-processor systems (e.g., an Intel™-based processor) or other type of commercially available processor able to support communications in accordance with each particular embodiment and application.

Figure 2:
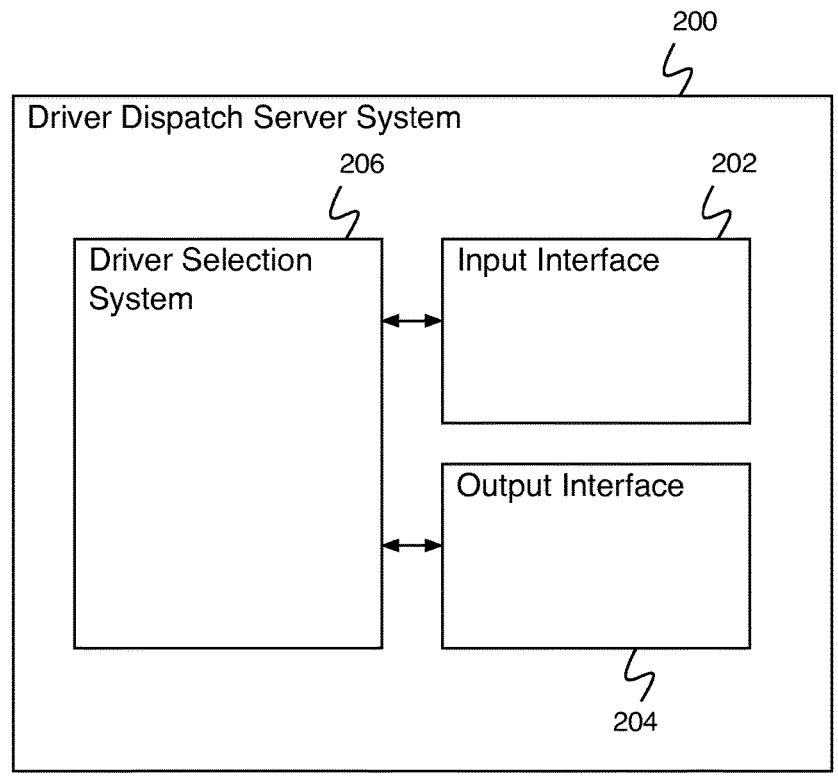
FIG. 2 is a block diagram illustrating an embodiment of a driver dispatch server system.

FIG. 2 is a block diagram illustrating an embodiment of a driver dispatch server system. In some embodiments, driver dispatch server system 200 comprises driver dispatch server system 106 of FIG. 1. In the example shown, driver dispatch server system 200 comprises input interface 202. In some embodiments, input interface 202 comprises an input interface for receiving information via a network (e.g., a wired, wireless, internet, cell phone or other communication network enabling communication from a rider system or a driver system). In various embodiments, input interface 202 comprises an input interface for receiving a request for a pickup including a first pickup location and a first destination, for receiving a first pickup arrival indication indicating a driver arrived at the first pickup location, receiving a request for a second pickup including a second pickup location and a second destination, or for receiving any other appropriate information. In some embodiments, input interface 202 is implemented using a processor. Driver dispatch server system 200 additionally comprises output interface 204. In some embodiments, output interface 204 comprises an output interface for providing information via a network (e.g., a wired, wireless, internet, cell phone or other communication network enabling communication to a rider system or a driver system). In various embodiments, output interface 204 comprises an output interface for providing a first pickup indication to a driver to go to a first pickup location, for providing a first destination indication indicating to the driver to go to the first destination, or for providing any other appropriate information. In some embodiments, output interface 204 is implemented using a processor. Driver selection system 206 comprises a driver selection system for selecting a driver. In some embodiments, driver selection system 206 selects a driver to assign to a ride based on a ride criteria. In some embodiments, driver selection system receives a ride request (e.g., via input interface 202) and determines a driver to assign the ride. In some embodiments, driver selection system 206 determines a driver for ride chaining (e.g., assigning a ride to a driver that is in the process of carrying out a route including one or more rides). In various embodiments, driver selection system 206 determines a driver based at least in part on a detour criterion, a pickup delay criterion, a distance criterion, or any other appropriate criteria. In some embodiments, driver selection system 206 is implemented using a processor. In various embodiments, the elements of driver dispatch server system 200 are implemented all on a single processor, each on an individual processor, or shared among multiple processors in any appropriate way. In some embodiments, driver selection system 206 monitors existing en route rides being driven by drivers to determine potential rides that a new ride request can be combined with.

Figure 3:
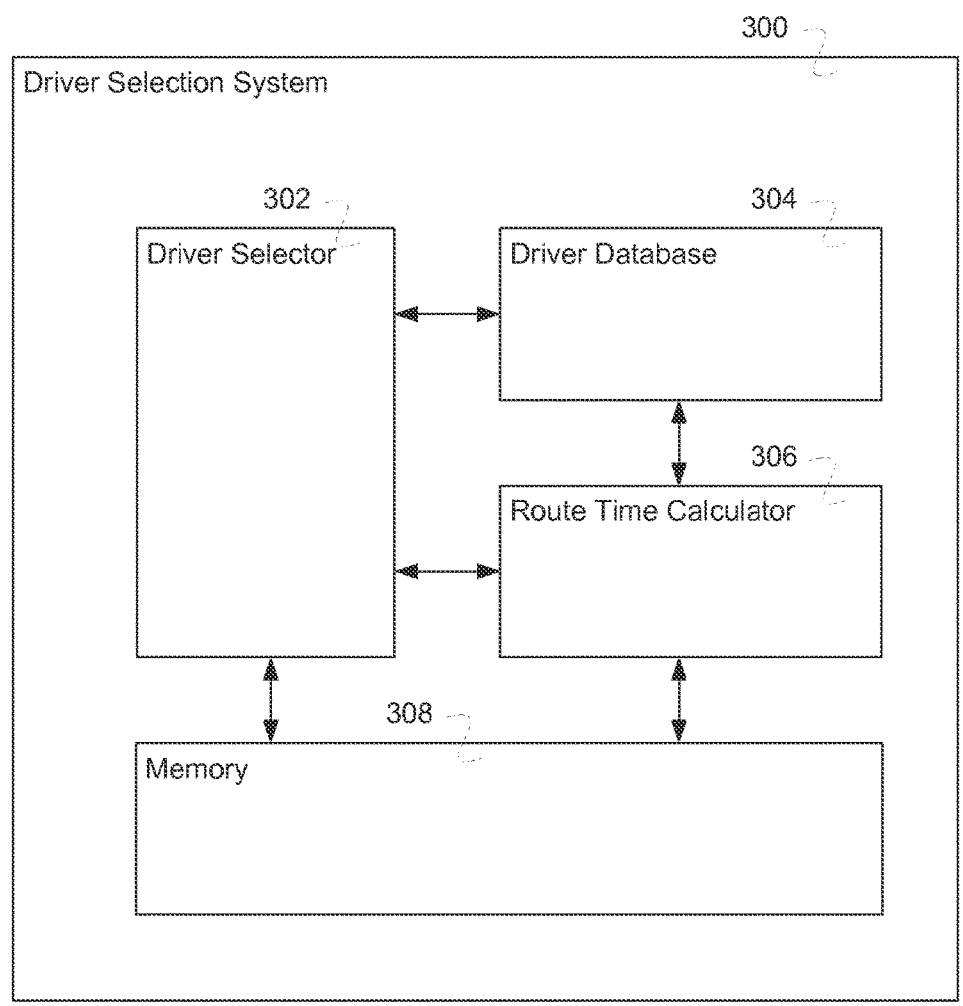
FIG. 3 is a block diagram illustrating an embodiment of a driver selection system.

FIG. 3 is a block diagram illustrating an embodiment of a driver selection system. In some embodiments, driver selection system 300 implements driver selection system 206 of FIG. 2. In the example shown, driver selector comprises a selector for selecting a driver. In some embodiments, driver selector 302 comprises a selector for selecting a driver from driver database 304. Driver database 304 comprises a database of driver information. In various embodiments, driver information comprises driver name, driver vehicle type, driver vehicle capacity, driver present location, driver assigned route, or any other appropriate information. Driver selector 302 additionally uses route time information determined by route time calculator 306 for determining a driver. Route time calculator comprises a calculator for determining (e.g., estimating) a time for a proposed route for a driver. In some embodiments, route time calculator determines a detour time incurred by adding a new rider to an existing route for a driver. Memory 308 is coupled with driver selector 302 and route time calculator 306 and stores and provides instructions to driver selector 302 and/or route time calculator 306.

In some embodiments, driver database 304 is updated with a new rider—driver assignment and new route configuration—for example, the new rider(s) and new route for the driver are stored in driver database 304. In some embodiments, a next rider request for a ride is evaluated using updated driver database 304. In some embodiments, existing requests for a ride are re-evaluated using updated driver database 304.

Figure 4:
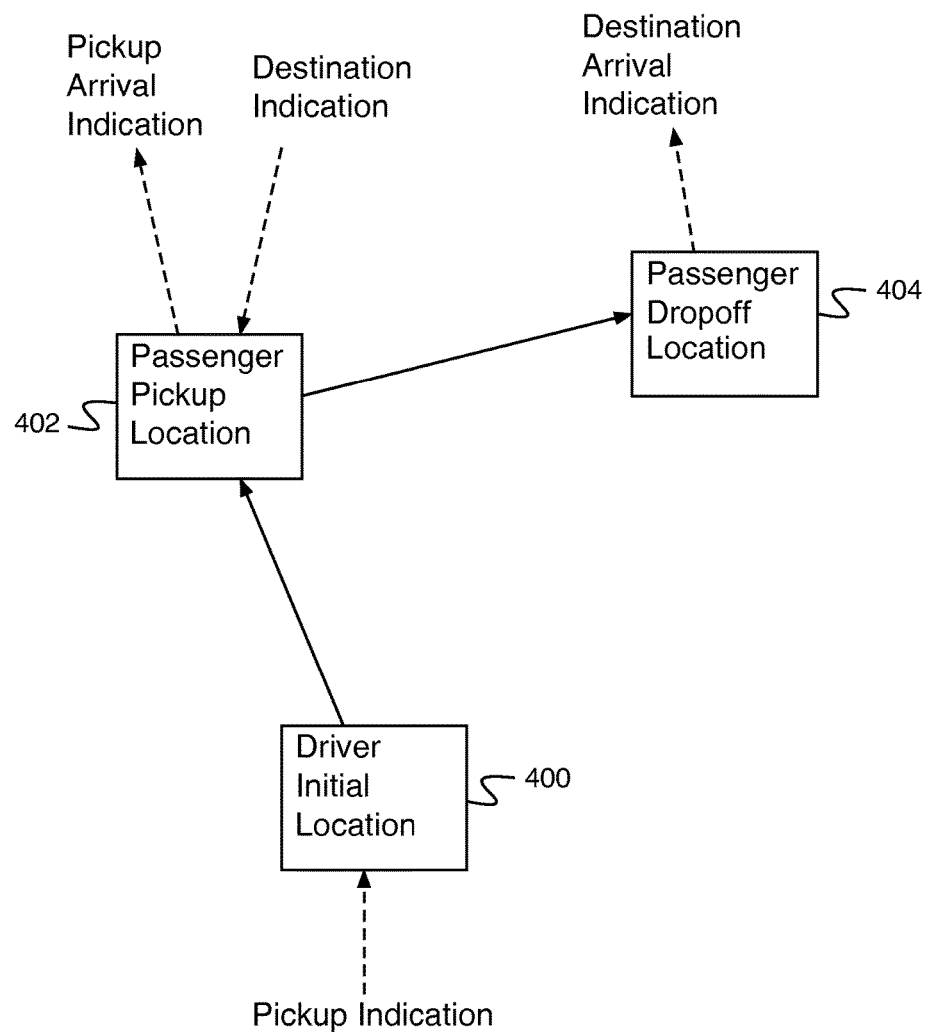
FIG. 4 is a diagram illustrating an embodiment of route for a driver making a single pick up and dropoff.

FIG. 4 is a diagram illustrating an embodiment of route for a driver making a single pick up and dropoff. The diagram of FIG. 4 additionally shows communications between the driver and a driver dispatch server system. In some embodiments, the driver comprises a driver using a driver system (e.g., driver system 104 of FIG. 1) in communication with a driver dispatch server system (e.g., driver dispatch server system 106 of FIG. 1). In the example shown, driver paths between locations are drawn with solid lines and driver communications are drawn with dashed lines. The driver starts at driver initial location 400. When the driver is at driver initial location 400, a pickup indication is received (e.g., from the driver dispatch server system). The pickup indication comprises a passenger pickup location. A route is determined for the driver and first passenger pickup location 402 is provided to the driver (e.g., determined from the first pickup indication). The driver then drives to passenger pickup location 402. At passenger pickup location 402, a pickup arrival indication is provided and a destination indication is received. In some embodiments, the destination indication is received concurrently with the pickup indication. In some embodiments, the destination indication comprises a passenger destination. In some embodiments, the destination indication comprises an indication to drive to the passenger destination. The driver additionally picks up one or more passengers at passenger pickup location 402. The driver then drives to passenger dropoff location 404. The driver provides a destination arrival indication and drops off the one or more passengers. The route is then complete.

Figure 5:
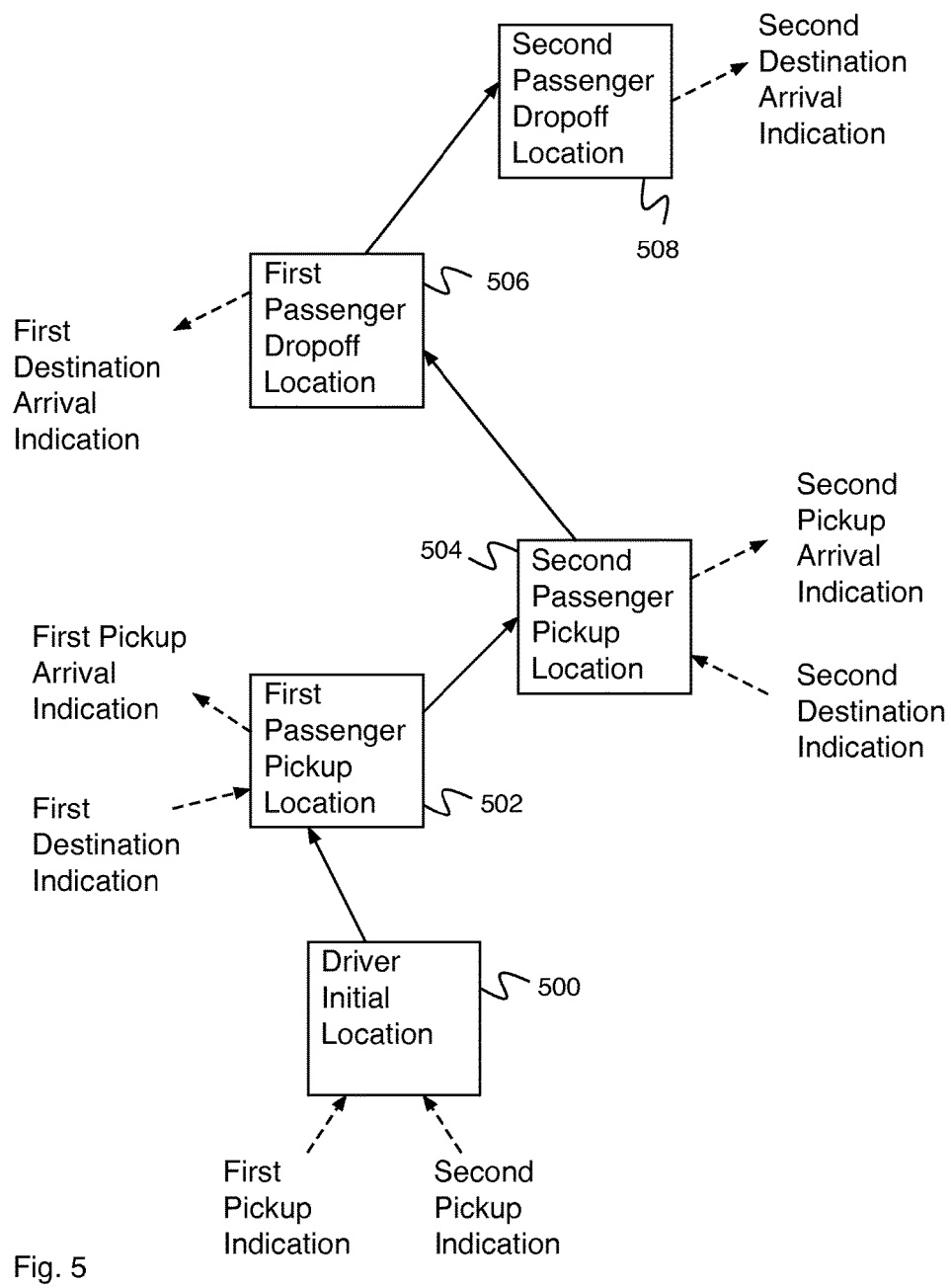
FIG. 5 is a diagram illustrating an embodiment of a route for a driver making two pickups and two dropoffs combined into a single route.

FIG. 5 is a diagram illustrating an embodiment of a route for a driver making two pickups and two dropoffs combined into a single route. The diagram of FIG. 5 shows communications between the driver and a driver dispatch server system. In some embodiments, the driver comprises a driver using a driver system (e.g., driver system 104 of FIG. 1) in communication with a driver dispatch server system (e.g., driver dispatch server system 106 of FIG. 1). In the example shown, driver paths between locations are drawn with solid lines and driver communications are drawn with dashed lines. The driver starts at driver initial location 500. When the driver is at driver initial location 500, a first pickup indication and a second pickup indication are received. A route is determined for the driver and first passenger pickup location 502 is provided to the driver (e.g., determined from the first pickup indication). The driver then drives to first passenger pickup location 502. When the driver arrives at first passenger pickup location 502, a first pickup arrival indication is provided, and a first destination indication is received. The first destination indication comprises the destination associated with the first passenger pickup location. In some embodiments, the first destination indication is received concurrently with the first pickup indication. The driver additionally picks up one or more passengers at first passenger pickup location 502. In some embodiments, the driver confirms that passengers were picked up at first passenger pickup location 502. In some embodiments, the driver confirms the number of passengers picked up at first passenger pickup location 502 (e.g., indicates the number of passengers picked up at first passenger pickup location 502, receives an indication of an expected number of passengers and confirms that that number of passengers were picked up at first passenger pickup location 502, etc.). In some embodiments, in the event that the number of passengers to pick up is greater than the expected number of passengers (e.g., in the event that a rider called for a ride for one person but has three friends he expects to take with him) the driver refuses to take the party on the ride and the first ride is cancelled (e.g., because the driver has additionally agreed to take a second group of passengers together with the first group and will not have enough room with the unexpected larger group). Second passenger pickup location 504 is then provided to the driver (e.g., determined from the second pickup indication). The driver then drives to second passenger pickup location 504. At second passenger pickup location 504 a second pickup arrival indication is provided and a second destination indication is received. In some embodiments, the second destination indication is received concurrently with the second pickup indication. The driver additionally picks up one or more passengers at second passenger pickup location 504. In some embodiments, the driver confirms that passengers were picked up at second passenger pickup location 504. In some embodiments, the driver confirms the number of passengers picked up at second passenger pickup location 504. First passenger dropoff location 506 is then provided to the driver (e.g., determined from the first destination indication). The driver then drives to first passenger dropoff location 506. A first destination arrival indication is provided. The driver additionally drops off the one or more passengers picked up at first passenger pickup location 502. In some embodiments, the driver confirms that the one or more passengers picked up at first passenger pickup location 502 were dropped off. Second passenger dropoff location 508 is then provided to the driver (e.g., determined from the second destination indication). The driver then drives to second passenger dropoff location 508. A second destination arrival indication is provided. The driver additionally drops off the one or more passengers picked up at second passenger pickup location 504. In some embodiments, the driver confirms that the one or more passengers picked up at second passenger pickup location 504 were dropped off. The route is then complete. In some embodiments, the second passenger dropoff location precedes the first passenger dropoff location in the route and the second set of passengers is dropped off prior to the first set of passengers and the indication for second destination arrival and the indication for first destination arrival are provided appropriately.

Figure 6:
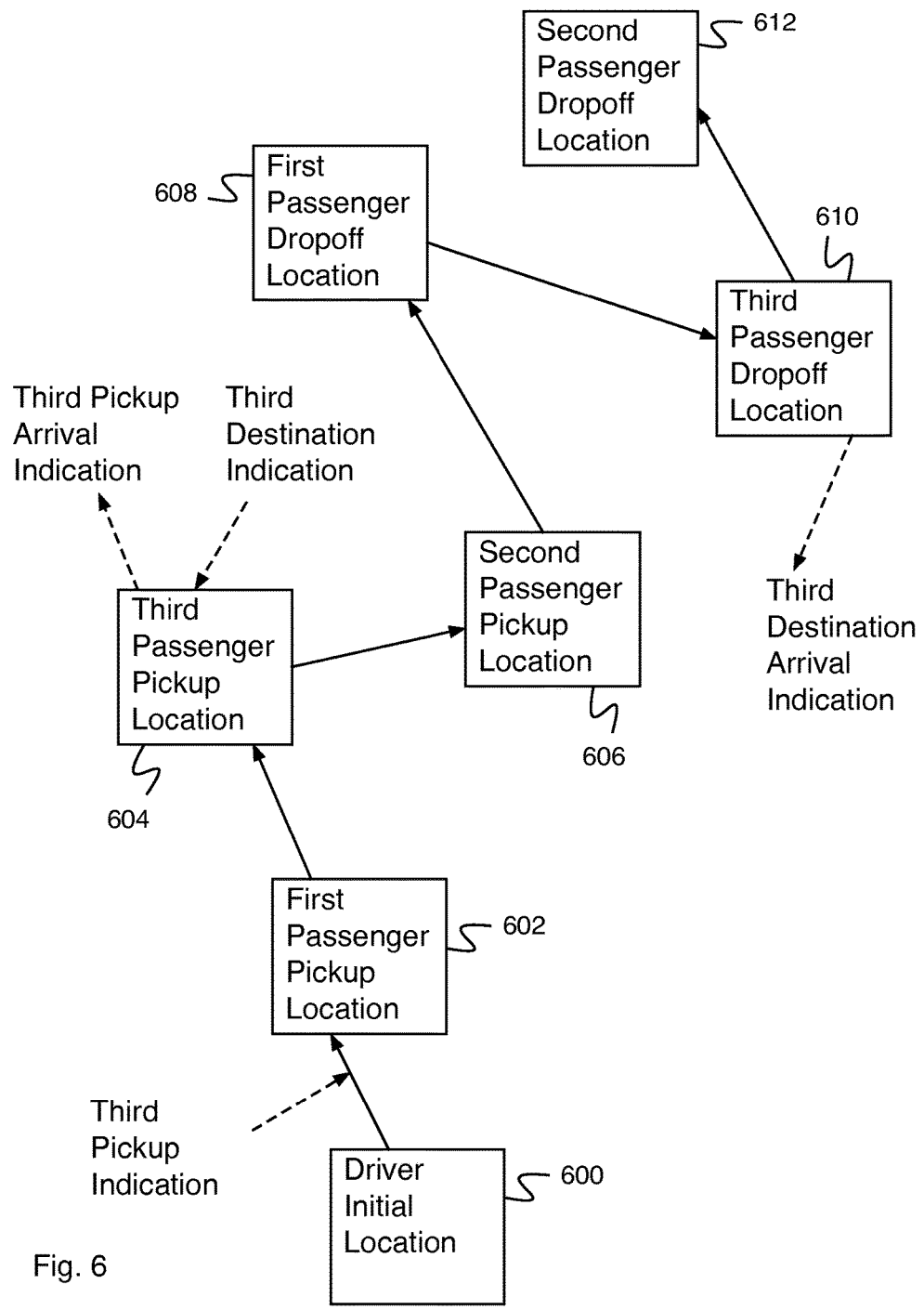
FIG. 6 is a diagram illustrating an embodiment of a chained route for a driver, adding a third pickup and dropoff to a route already comprising two pickups and two dropoffs.

FIG. 6 is a diagram illustrating an embodiment of a chained route for a driver, adding a third pickup and dropoff to a route already comprising two pickups and two dropoffs. In some embodiments, the route of FIG. 6 comprises the route of FIG. 5 with a third passenger pickup and dropoff added after the route has started. The diagram of FIG. 6 additionally shows communications between the driver and a driver dispatch server system. Only communications additional to the communications of FIG. 5 are shown (e.g., each communication that is shown in FIG. 5 additionally occurs during the route of FIG. 6 but is not shown). In some embodiments, the driver comprises a driver using a driver system (e.g., driver system 104 of FIG. 1) in communication with a driver dispatch server system (e.g., driver dispatch server system 106 of FIG. 1). In the example shown, driver paths between locations are drawn with solid lines and driver communications are drawn with dashed lines. The driver starts at driver initial location 600. As the driver proceeds to first passenger pickup location 602, a third pickup indication is received. After the driver reaches first passenger pickup location 602 and picks up passengers, the driver is provided with third passenger pickup location 604. In some embodiments, the driver system determines that the pickup associated with the third pickup indication should happen prior to the pickup associated with the second pickup indication. The driver then drives to third passenger pickup location 604. When the driver arrives at third passenger pickup location 604, a third pickup arrival indication is provided, and a third destination indication is received. The third destination indication comprises the destination associated with the third passenger pickup location. In some embodiments, the third destination indication is received concurrently with the third pickup indication. The driver additionally picks up one or more passengers at third passenger pickup location 604. In some embodiments, the driver confirms that passengers were picked up at third passenger pickup location 604. In some embodiments, the driver confirms the number of passengers picked up at third passenger pickup location 604 (e.g., indicates the number of passengers picked up at third passenger pickup location 604, receives an indication of an expected number of passengers and confirms that that number of passengers were picked up at third passenger pickup location 604, etc.). The driver then proceeds to pick up passengers at second passenger pickup location 606 and drop off passengers at first passenger dropoff location 608. The driver is then provided with third passenger dropoff location 610 (e.g., scheduled before second passenger dropoff location 612 by the driver system). The driver drives to third passenger dropoff location 610 and drops off the one or more passengers picked up at third passenger pickup location 604. A third destination arrival indication is provided. The driver proceeds to drop off passengers at second passenger dropoff location 612, and the route is complete.

In various embodiments, an additional passenger pickup is added for a route with only one passenger pickup, with two passenger pickup, with three passenger pickup, with four passenger pickup, or any other number of passenger pickups. In various embodiments, the order of the pickups and drop-offs is any combination or permutation of the pickups or drop-offs.

Figure 7:
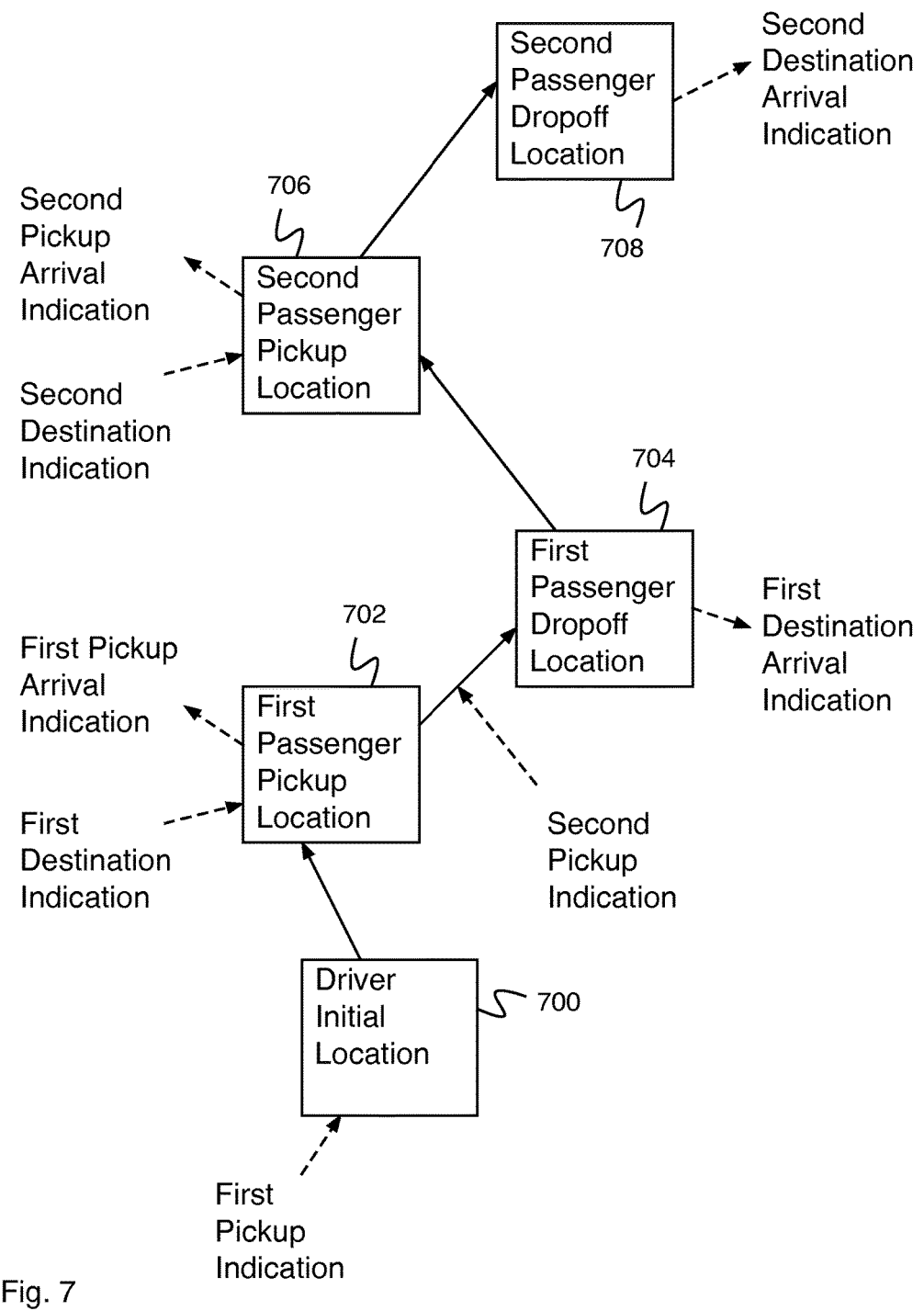
FIG. 7 is a diagram illustrating a chained route for a driver, adding a second pickup and dropoff to a route comprising a single pickup and dropoff.

FIG. 7 is a diagram illustrating a chained route for a driver, adding a second pickup and dropoff to a route comprising a single pickup and dropoff. The diagram of FIG. 7 additionally shows communications between the driver and a driver dispatch server system. In some embodiments, the driver comprises a driver using a driver system (e.g., driver system 104 of FIG. 1) in communication with a driver dispatch server system (e.g., driver dispatch server system 106 of FIG. 1). In the example shown, driver paths between locations are drawn with solid lines and driver communications are drawn with dashed lines. The driver starts at driver initial location 700. When the driver is at driver initial location 700, a first pickup indication is received (e.g., from the driver dispatch server system). The first pickup indication comprises a passenger pickup location. A route is determined for the driver and first passenger pickup location 702 is provided to the driver (e.g., determined from the first pickup indication). The driver drives to first passenger pickup location 702. At first passenger pickup location 702, the driver provides a first pickup arrival indication and receives a first destination indication. In some embodiments, the first destination indication is received concurrently with the first pickup indication. The driver additionally picks up one or more passengers at first passenger pickup location 702. The driver then drives to first passenger dropoff location 704. While driving to first passenger dropoff location 704, the driver receives a second pickup indication. After reaching first passenger dropoff location 704, a destination arrival indication is provided and the one or more passengers are dropped off. Second passenger pickup location 706 is then provided to the driver (e.g., determined from the second pickup indication). The driver drives to second passenger pickup location 706. At second passenger pickup location 706, the driver provides a second pickup arrival indication and receives a second destination indication. In some embodiments, the second destination indication is received concurrently with the second pickup indication. The driver additionally picks up one or more passengers at second passenger pickup location 706. The driver then drives to second passenger dropoff location 708. After reaching second passenger dropoff location 708, a second destination arrival indication is provided and the one or more passengers picked up at second passenger pickup location 706 are dropped off. The route is then complete.

In some embodiments, rides are chained as in FIG. 7 and/or are also intertwined similar to FIG. 5 and FIG. 6 in a continuing sequence. In some embodiments, a driver receives a new passenger pickup during any part of a current route (e.g., when en route to a pickup, when en route to a dropoff, etc.).

In some embodiments, the system tracks a set of drivers about to dropoff a passenger to see whether any incoming requests for a ride can match for a ride chaining as in FIG. 7.

Figure 8A:
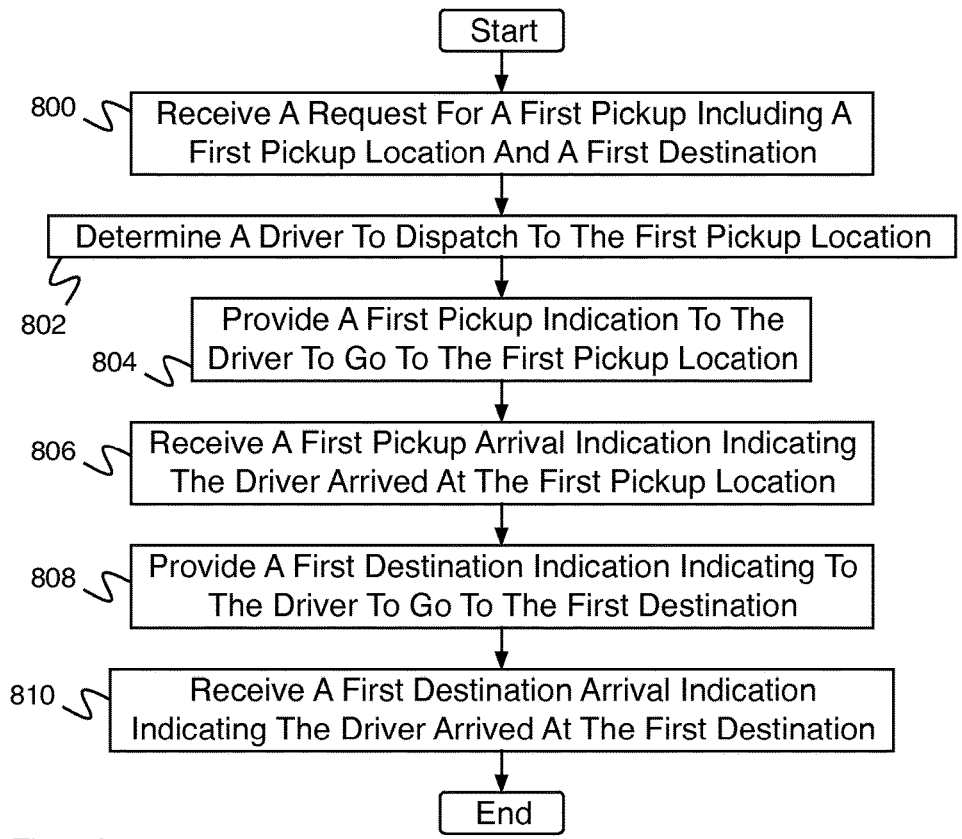
FIG. 8A is a flow diagram illustrating an embodiment of a process for a dispatch.

FIG. 8A is a flow diagram illustrating an embodiment of a process for a dispatch. In some embodiments, the process of FIG. 8A is executed by driver dispatch server system 106 of FIG. 1. In the example shown, in 800, a request for a first pickup including a first pickup location and a first destination is received. In 802, a driver is determined to dispatch to the first pickup location. In some embodiments, the driver comprises a driver that is already driving (e.g., a driver that will be closest to the pickup location at the soonest). In some embodiments, the driver comprises a driver that is not already driving (e.g., a driver that is closest to the pickup location). In 804, a first pickup indication is provided to the driver to go to the first pickup location. In 806, a first pickup arrival indication indicating the driver has arrived at the first pickup location is received. In 808, a first destination indication indicating to the driver to go to the first destination is received. In 810, a first destination arrival indication indicating the driver has arrived at the first destination is received.

Figure 8B:
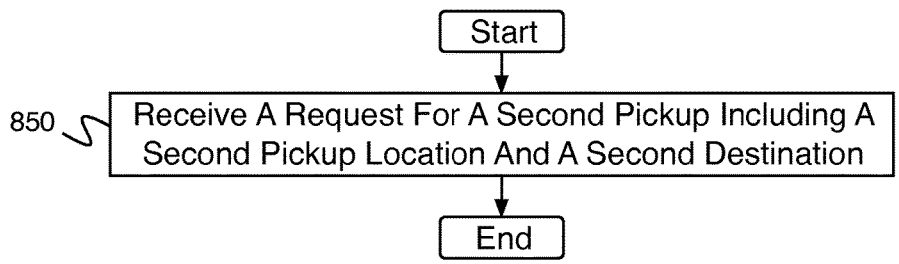
FIG. 8B is a flow diagram illustrating an embodiment of a process for receiving a request for a second pickup during a dispatch.

FIG. 8B is a flow diagram illustrating an embodiment of a process for receiving a request for a second pickup during a dispatch. In some embodiments, the process of FIG. 8B is executed by driver dispatch server system 106 of FIG. 1. In some embodiments, the process of FIG. 8B occurs concurrently with the process of FIG. 8A. In the example shown, in 850, a request for a second pickup including a second pickup location and a second destination is received. In various embodiments, the process of FIG. 8B occurs prior to 800 of FIG. 8A, after 800 of FIG. 8A, after 802 of FIG. 8A, after 804 of FIG. 8A, after 806 of FIG. 8A, after 808 of FIG. 8A, or at any other appropriate time.

Figure 9:
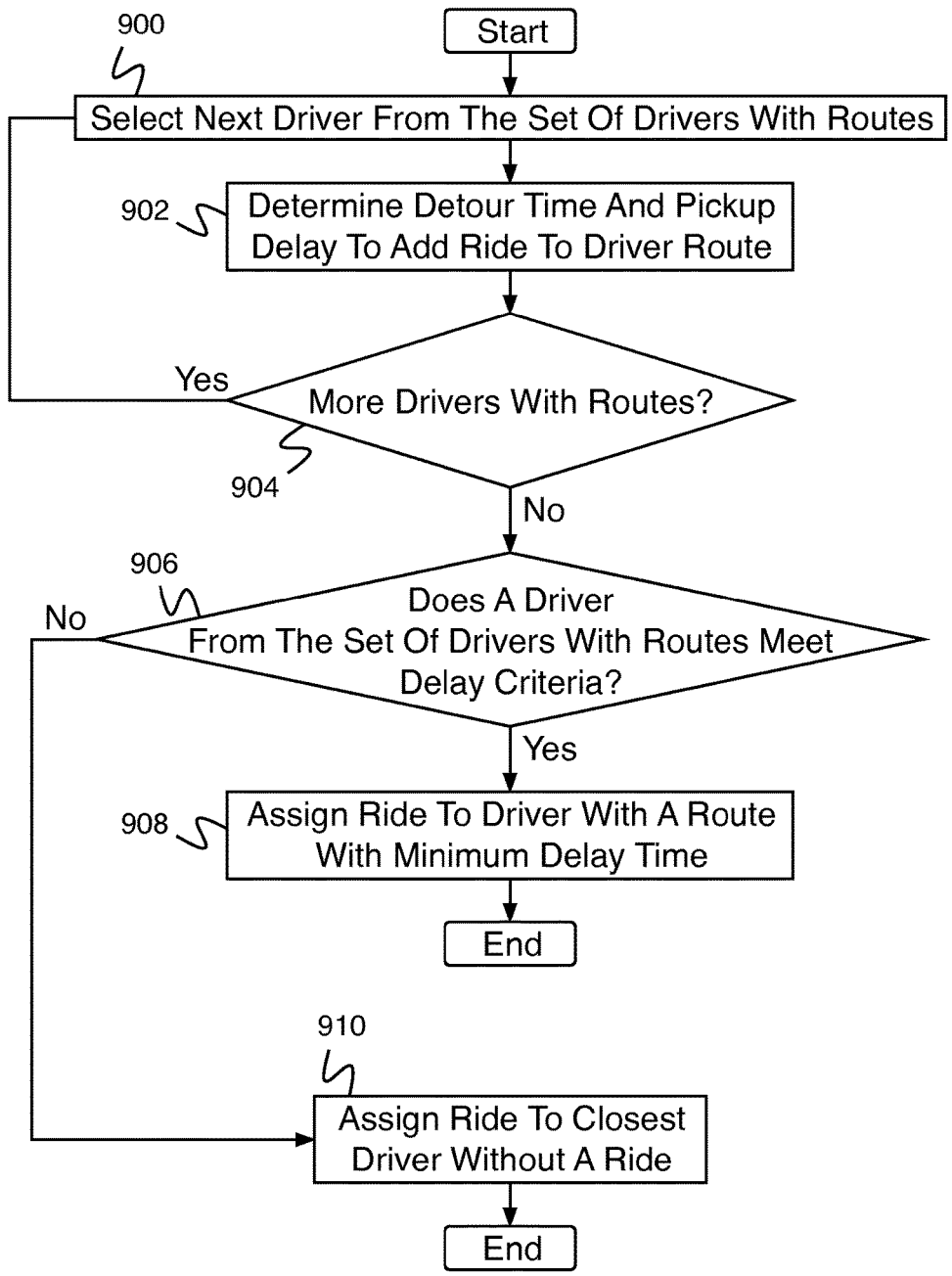
FIG. 9 is a flow diagram illustrating an embodiment of a process for determining a driver to dispatch to a pickup location.

FIG. 9 is a flow diagram illustrating an embodiment of a process for determining a driver to dispatch to a pickup location. In some embodiments, the process of FIG. 9 implements 802 of FIG. 8. In some embodiments, the process of FIG. 9 comprises a process for determining a driver to assign a ride to (e.g., a ride requested by a rider using a rider system). In the example shown, in 900, the next driver is selected from the set of drivers with routes (e.g., drivers that have already been assigned routes by the driver dispatch server system). In some embodiments, the next driver comprises the first driver. In 902, the detour time (e.g., the amount of time by which adding the ride extends the route) and pickup delay (e.g., the delay until the ride passenger is picked up) are determined to add the ride to the driver route (e.g., the route assigned to the selected driver). In 904, it is determined if there are more drivers with routes. In the event it is determined that there are more drivers with routes, control passes to 900. In the event it is determined that there are no more drivers with routes, control passes to 906. In 906, it is determined whether a driver from the set of drivers with routes meets delay criteria. In various embodiments, the delay criteria comprises a limit on the detour time (e.g., extending the ride by a factor of 1.3, extending the ride by 15 minutes, etc.), the delay criteria comprises a limit on pickup delay (e.g., 5 minutes, 10 minutes, etc.), the delay criteria comprises a limit on both detour time and pickup delay (e.g., a limit on the sum of the detour time and the pickup delay, a limit on the product of the detour time and the pickup delay, etc.), or the delay criteria comprises any other appropriate criteria. In the event it is determined that a driver from the set of drivers with routes meets the delay criteria, control passes to 908. In 908, the ride is assigned to the driver with a route with minimum delay time (e.g., detour time, pickup delay, a combination of detour time and pickup delay, etc.). The process then ends. In the event it is determined in 906 that a driver from the set of drivers with routes does not meet the delay criteria, control passes to 910. In 910, the ride is assigned to the closest driver without a ride (e.g., the driver without a ride with minimum pickup delay).

Figure 10:
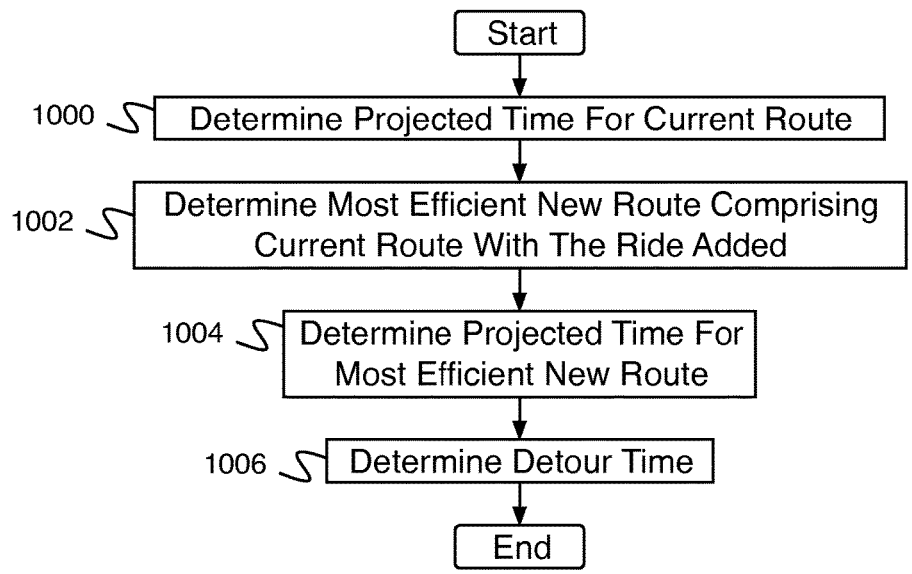
FIG. 10 is a flow diagram illustrating an embodiment of a process for determining a detour time.

FIG. 10 is a flow diagram illustrating an embodiment of a process for determining a detour time. In some embodiments, the process of FIG. 10 implements determining a detour time (e.g., determining a detour time as in 902 of FIG. 9). In some embodiments, determining a detour time comprises determining an amount of time that adding a ride extends a route. In the example shown, in 1000, a projected time for a current route is determined (e.g., using a route time calculator—for example, route time calculator 306 of FIG. 3). In 1002, the most efficient new route comprising the current route with the ride added is determined. In 1004, the projected time for the most efficient new route is determined. In 1006, the detour time is determined. In some embodiments, the detour time comprises the difference in the projected time for the most efficient new route and the projected time for the current route.

Figure 11:
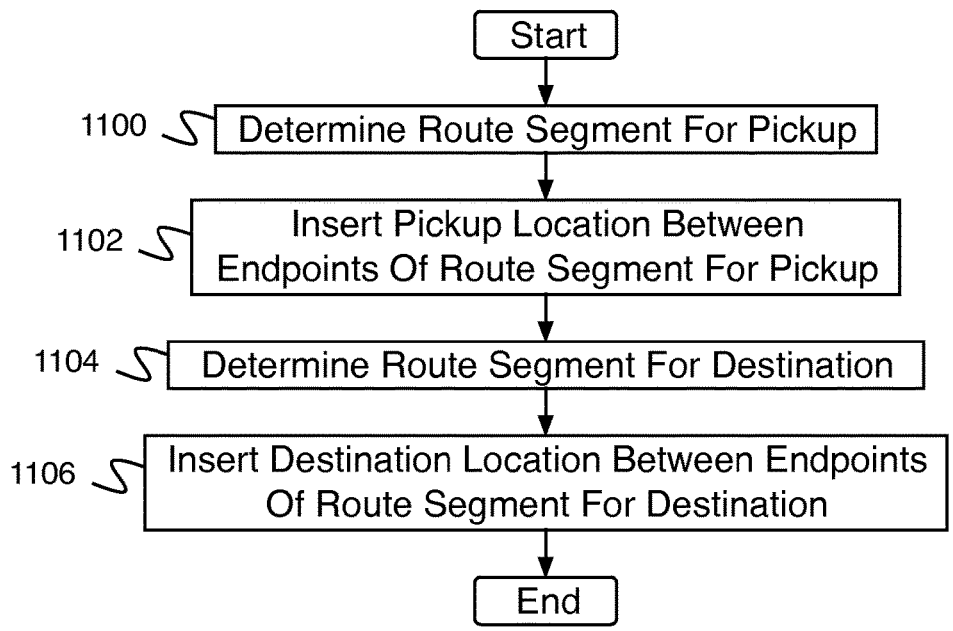
FIG. 11 is a flow diagram illustrating an embodiment of a process for determining a most efficient new route comprising a current route with a ride added.

FIG. 11 is a flow diagram illustrating an embodiment of a process for determining a most efficient new route comprising a current route with a ride added. In some embodiments, the process of FIG. 11 implements 1002 of FIG. 10. In the example shown, in 1100, the route segment for pickup (e.g., the segment of the route in which the pickup location of the ride should be added) is determined. In some embodiments, the route segment for pickup is determined by determining the route segment closest to the pickup location. In some embodiments, the route segment for pickup is determined by determining a first route location closest to the pickup location and selecting the route segment connecting to the first route location with an opposite route location closer to the route segment for pickup. In 1102, the pickup location is inserted between the endpoints of the route segment for pickup. In 1104, the route segment for the destination is determined. In 1106, the destination location is inserted between the endpoints of the route segment for the destination.

Figure 12:
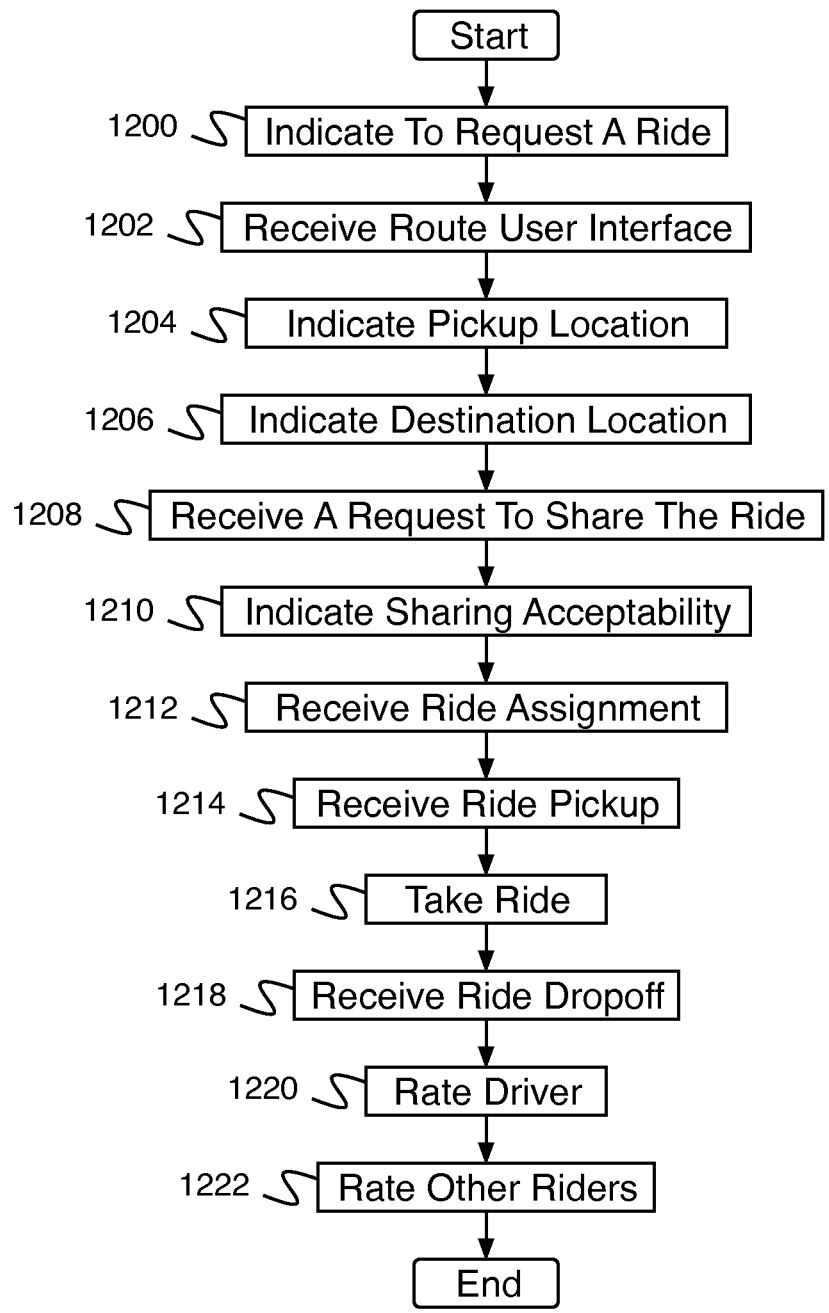
FIG. 12 is a flow diagram illustrating an embodiment of a rider process.

FIG. 12 is a flow diagram illustrating an embodiment of a rider process. In some embodiments, the process of FIG. 12 is executed by a rider using a rider system (e.g., rider system 102 of FIG. 1). In the example shown, in 1200, the rider indicates to request a ride. In 1202, the rider receives a route user interface (e.g., a user interface for indicating a route). In 1204, the rider indicates a pickup location (e.g., using the user interface). In 1206, the rider indicates a destination location (e.g., using the user interface). In 1208, the rider receives a request to share the ride (e.g., a request to indicate whether sharing the ride with other passengers is acceptable). In some embodiments, a rider receives a ride discount in the event that the ride is shared. In 1210, sharing acceptability is indicated. In 1212, the rider receives a ride assignment (e.g., from a driver dispatch server system). In 1214, the rider receives a ride pickup (e.g., a driver arrives and picks the rider up). In 1216, the rider takes the ride. In some embodiments, the ride is shared with other riders (e.g., when the passenger was picked up other riders were already in the vehicle, or during the course of the ride other riders were picked up). In 1218, the rider receives a ride dropoff (e.g., the destination is reached and the rider is dropped off). In 1220, the rider rates the driver (e.g., indicates to the driver dispatch server system a rating of the driver quality). In 1222, the rider rates other riders (e.g., other riders the ride was shared with).

Figure 13:
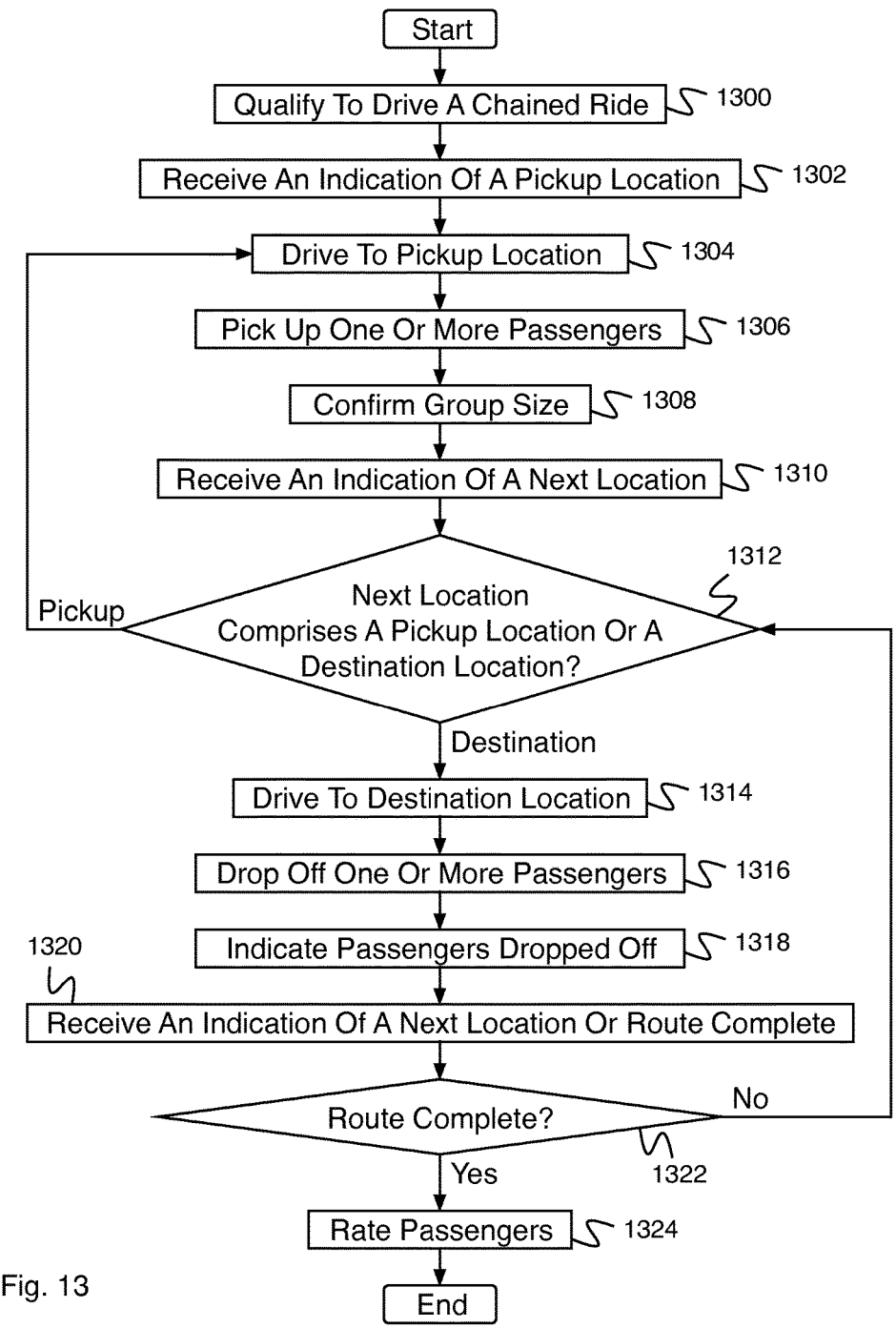
FIG. 13 is a flow diagram illustrating an embodiment of a driver process.

FIG. 13 is a flow diagram illustrating an embodiment of a driver process. In some embodiments, the process of FIG. 13 is executed by a driver using a driver system (e.g., driver system 104 of FIG. 1). In the example shown, in 1300, the driver qualifies to drive a chained ride. In various embodiments, in order to driver a chained ride, the driver is required to log a certain number of driving hours, pass a test, achieve a certain customer rating, or qualify in any other appropriate way. In 1302, an indication of a pickup location is received. In 1304, the driver drives to the pickup location. In 1306, the driver picks up one or more passengers. In 1308, the driver confirms the group size (e.g., the driver receives an indication indicating the group size and confirms that the number of passengers picked up matches the group size). In some embodiments, in the event that the group size is incorrect, the driver turns the passengers away. In 1310, the driver receives an indication of a next location (e.g., a next location to drive to). In 1312, the driver determines whether the next location comprises a pickup location or a destination location. In the event the next destination comprises a pickup location, control passes to 1304. In the event the next location comprises a destination location, control passes to 1314. In 1314, the driver drives to the destination location. In 1316, the driver drops off one or more passengers. In 1318, the driver indicates that passengers dropped off. In 1320, the driver receives an indication indicating a next location or that the route is complete. In 1322, it is determined whether the indication comprises a route complete indication. In the event the indication comprises a next location, control passes to 1312. In the event the indication comprises a route complete indication, control passes to 1324. In 1324, the driver rates the passengers (e.g., the passengers driven on the route).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   at least one processor; and
   at least one non-transitory computer readable medium comprising instructions that, when executed by the at least one processor, cause a computing device to:
   receive, from a first requestor client device, a first request for a first ride, wherein the first request comprises a first number of passengers and a first pickup location;
   receive, from a second requestor client device, a second request for a second ride, wherein the second request comprises a second number of passengers and a second pickup location;
   determine to combine the first ride with the second ride based on a passenger capacity associated with a vehicle being greater than or equal to a sum of the first number of passengers of the first ride and the second number of passengers of the second ride;
   select an alternative pickup location to replace the second pickup location of the second ride based on the determination to combine the first ride and the second ride;
   generate a combined route comprising the alternative pickup location; and
   provide, to a provider client device associated with the vehicle, dispatch instructions to travel the combined route comprising the alternative pickup location.

2. The system of claim 1, further comprising instructions that, when executed by the at least one processor, cause the computing device to determine an updated available space associated with the vehicle based on combining the first ride with the second ride.

3. The system of claim 1, further comprising instructions that, when executed by the at least one processor, cause the computing device to:
   receive an indication of an actual number of passengers picked up at the first pickup location; and
   determine an updated available space associated with the vehicle based on the actual number of passengers being different from the first number of passengers included with the first request.

4. The system of claim 1, further comprising instructions that, when executed by the at least one processor, cause the computing device to determine an updated available space associated with the vehicle based on receiving an indication of a number of passengers dropped off at a dropoff location associated with the first ride.

5. The system of claim 4, wherein the number of passengers dropped off at the dropoff location associated with the first ride is less than the first number of passengers associated with the first ride.

6. The system of claim 1, further comprising instructions that, when executed by the at least one processor, cause the computing device to determine that the first ride and the second ride are similar, and wherein determining to combine the first ride with the second ride is further based on determining that the first ride and second ride are similar.

7. The system of claim 6, wherein the first ride and the second ride are determined as similar based on a combination of at least two of:
   a first distance criterion between the first pickup locations and the second pickup location;
   a second distance criterion between a first dropoff locations for the first ride and a second dropoff location for the second ride; and
   an amount of overlapping route portions between a first route corresponding to the first ride and a second route corresponding to the second ride.

8. The system of claim 6, further comprising instructions that, when executed by the at least one processor, cause the computing device to:
   determine a charge for the second ride based on the second pickup location and a second dropoff location associated with the second ride;
   determine a discount for the second ride based on an amount of similarity between the first ride and the second ride; and
   applying the discount to the charge for the second ride.

9. The system of claim 1, further comprising instructions that, when executed by the at least one processor, cause the computing device to provide the alternative pickup location to the first requestor client device and the second requestor client device.

10. The system of claim 1, further comprising instructions that, when executed by the at least one processor, cause the computing device to:
    receive a ride completed indicator for the first ride;
    provide a ride rating request to the first requestor client device associated with the first ride;
    receive a ride rating indicator from the first requestor client device;
    update a vehicle profile rating of the vehicle based on the ride rating indicator;
    provide a rider rating request to the first requestor client device associated with the first ride;
    receive a rider rating indicator from the first requestor device; and
    update a rider profile rating of a second requestor associated with the second ride based on the rider rating indicator.

11. A method, comprising:
    receiving, from a first requestor client device, a first request for a first ride, wherein the first request comprises a first number of passengers and a first pickup location;
    receiving, from a second requestor client device, a second request for a second ride, wherein the second request comprises a second number of passengers and a second pickup location;
    determining to combine the first ride with the second ride based on a passenger capacity associated with a vehicle being greater than or equal to a sum of the first number of passengers of the first ride and the second number of passengers of the second ride;
    selecting an alternative pickup location to replace the second pickup location of the second ride based on the determination to combine the first ride and the second ride;
    generating a combined route comprising the alternative pickup location; and
    providing, to a provider client device associated with the vehicle, dispatch instructions that instruct the vehicle to travel the combined route comprising the alternative pickup location.

12. The method of claim 11, further comprising determining an updated available space associated with the vehicle in response to combining the first ride with the second ride.

13. The method of claim 11, further comprising:
    receiving an indication of an actual number of passengers picked up at the first pickup location; and
    determining an updated available space associated with the vehicle based on the actual number of passengers being different from the first number of passengers included with the first request.

14. A non-transitory computer readable medium storing instructions thereon that, when executed by at least one processor, cause a computer system to:
    receive, from a first requestor client device, a first request for a first ride, wherein the first request comprises a first number of passengers and a first pickup location;
    receive, from a second requestor client device, a second request for a second ride, wherein the second request comprises a second number of passengers and a second pickup location;
    determine to combine the first ride with the second ride based on a passenger capacity associated with a vehicle being greater than or equal to a sum of the first number of passengers of the first ride and the second number of passengers of the second ride;
    select an alternative pickup location to replace the second pickup location of the second ride based on the determination to combine the first ride and the second ride;
    generate a combined route comprising the alternative pickup location; and
    provide, to a provider client device associated with the vehicle, dispatch instructions that instruct the vehicle to travel the combined route comprising the alternative pickup location.

15. The non-transitory computer readable medium of claim 14, further comprising instructions that, when executed by the at least one processor, cause the computer system to determine an updated available space associated with the vehicle based on combining the first ride with the second ride.

16. The non-transitory computer readable medium of claim 14, wherein the first request for the first ride further comprises a first dropoff location.

17. The non-transitory computer readable medium of claim 16, further comprising instructions that, when executed by the at least one processor, cause the computer system to select an alternative dropoff location to replace the first dropoff location of the first ride based on the determination to combine the first ride and the second ride.

18. The non-transitory computer readable medium of claim 14, further comprising instructions that, when executed by the at least one processor, cause the computer system to provide the alternative pickup location to the second requestor client device.

19. The non-transitory computer readable medium of claim 14, further comprising instructions that, when executed by the at least one processor, cause the computer system to replace the first pickup location with the alternative pickup location so that the first pickup location and the second pickup location are both the alternative pickup location.

20. The non-transitory computer readable medium of claim 19, wherein the alternative pickup location is at a location between the first pickup location and the second pickup location.

* * * * *